United States Patent [19]

McMullan et al.

[11] Patent Number: 5,320,648

[45] Date of Patent: Jun. 14, 1994

[54] PROCESS FOR DYEING OR PRINTING HYDROXYL GROUP CONTAINING FIBRE MATERIALS

[75] Inventors: David H. McMullan, Allschwil; Rudolf Schaulin, Riehen; Urs Lauk, Zürich, all of Switzerland

[73] Assignee: Ciba-Geigy Corporation, Ardsley, N.Y.

[21] Appl. No.: 991,670

[22] Filed: Dec. 16, 1992

[30] Foreign Application Priority Data

Dec. 20, 1991 [CH] Switzerland ............... 3815/91

[51] Int. Cl.⁵ .................. C09B 56/00; D06P 1/06
[52] U.S. Cl. ............................. 8/639; 8/543; 8/549; 8/641; 8/681; 8/685; 8/687; 8/688; 8/918; 8/922
[58] Field of Search ........... 8/638, 639, 641, 437; 260/153, 549, 638, 639, 641

[56] References Cited

U.S. PATENT DOCUMENTS

| | | | |
|---|---|---|---|
| 2,227,546 | 1/1941 | Krebser | 260/173 |
| 2,459,435 | 1/1949 | Keller et al. | 260/153 |
| 3,398,133 | 8/1968 | Barben et al. | 260/153 |
| 3,647,778 | 3/1972 | Andrew et al. | 260/153 |
| 3,658,782 | 4/1972 | Griffiths et al. | 260/153 |
| 3,966,705 | 6/1976 | Oesterlein et al. | 260/153 |
| 4,228,071 | 10/1980 | Riat et al. | 260/153 |
| 4,654,384 | 3/1987 | Ramanathan et al. | 534/604 |
| 4,866,163 | 9/1989 | Koch | 534/634 |
| 5,006,128 | 4/1991 | Pedrazzi | 8/437 |
| 5,006,644 | 4/1991 | Lehr | 534/625 |

FOREIGN PATENT DOCUMENTS

| | | |
|---|---|---|
| 011873 | 6/1980 | European Pat. Off. . |
| 044805 | 1/1982 | European Pat. Off. . |
| 116513 | 8/1984 | European Pat. Off. . |
| 0250365 | 6/1987 | European Pat. Off. . |
| 250365 | 12/1987 | European Pat. Off. . |
| 357560 | 3/1990 | European Pat. Off. . |
| 438380 | 3/1990 | European Pat. Off. . |
| 465420 | 1/1992 | European Pat. Off. . |
| 725224 | of 1942 | Fed. Rep. of Germany . |
| 2311396 | 9/1974 | Fed. Rep. of Germany . |
| 3320972 | 12/1983 | Fed. Rep. of Germany . |
| 1573145 | of 1969 | France . |
| 135951 | of 1929 | Switzerland . |
| 671025 | 7/1989 | Switzerland . |
| 1176898 | of 1970 | United Kingdom . |
| 2079327 | 1/1982 | United Kingdom . |
| 2166147 | 4/1986 | United Kingdom . |

OTHER PUBLICATIONS

Chem. Abst. 97(1982)111284t.
Chem. Abst. 98(1983)16265y.
Chem. Abst. 111(1989)136008b.
Derw Abst. 91-125481/18(1990).
Textilveredlung vol. 26(1991) Nr. 4 Denter et al. pp. 113-116.

Primary Examiner—Paul Lieberman
Assistant Examiner—Margaret Einsmann
Attorney, Agent, or Firm—Marla J. Mathias; George R. Dohmann

[57] ABSTRACT

The invention relates to a process for dyeing or printing hydroxyl group containing fibre materials, which comprises using at least one yellow or orange dyeing dye of formula

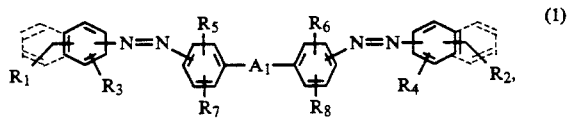

wherein the substituents are as defined in claim 1, together with at least one blue dyeing dye and/or at least one red dyeing dye. Level dyeings and prints with good allround fastness properties are obtained by the process of the invention.

17 Claims, No Drawings

PROCESS FOR DYEING OR PRINTING HYDROXYL GROUP CONTAINING FIBRE MATERIALS

The present invention relates to a process for dyeing or printing hydroxyl group containing fibre materials with dye mixtures by the dichromatic or trichromatic dyeing technique.

Dyeing or printing textile materials by the dichromatic or trichromatic technique requires, inter alia, the use of dyes that have as level a build-up as possible while at the same time having consistency of shade in different concentrations and good compatibility in order to obtain dyed or printed textile materials which substantially meet the demands made of them.

This object was not always achieved with the dyes and dye mixtures used heretofore, especially with respect to compatibility, uptake, fibre levelness and surface levelness, as well as allround fastness properties such as wetfastness. Hence it is the object of this invention to provide improved processes for dyeing and printing hydroxyl group containing fibre materials by the dichromatic or trichromatic dyeing technique.

It has now been found that the inventive process meets the aforementioned requirements.

Accordingly, the invention relates to a process for dyeing or printing hydroxyl group containing fibre materials, which comprises using at least one yellow or orange dyeing dye of formula

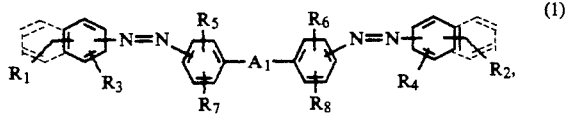

wherein $R_1$ and $R_2$ are hydrogen, $C_1$-$C_8$alkyl, $C_1$-$C_8$alkoxy, halogen, carboxy, sulfo, ureido, unsubstituted $C_2$-$C_6$alkanoylamino or $C_2$-$C_6$alkanoylamino which is substituted in the alkyl moiety, or unsubstituted or substituted arylazo, $R_3$, $R_4$, $R_5$, $R_6$, $R_7$ and $R_8$ are hydrogen, $C_1$-$C_8$alkyl, $C_1$-$C_8$alkoxy, halogen, carboxy, sulfo, ureido or $C_2$-$C_6$alkanoylamino which is unsubstituted or substituted in the alkyl moiety, and $A_1$ is a radical of formula

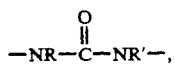

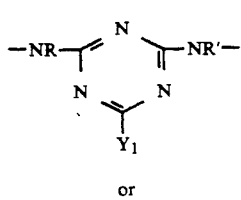

or

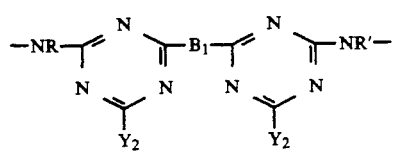

wherein R and R' are hydrogen or unsubstituted or substituted $C_1$-$C_8$alkyl, $Y_1$ in the radical of formula (3) and $Y_2$ in the radical of formula (4) are hydroxy, $C_1$-$C_4$alkoxy, chloro, bromo, $C_1$-$C_4$alkylthio, amino, N-mono- or N,N-di-$C_1$-$C_4$alkylamino which is unsubstituted or substituted in the alkyl moiety or moieties by hydroxy, sulfo, carboxy or $C_1$-$C_4$alkoxy, cyclohexylamino, phenylamino or N-$C_1$-$C_4$alkyl-N-phenylamino which are unsubstituted or substituted in the phenyl moiety by $C_1$-$C_4$alkyl, $C_1$-$C_4$alkoxy, carboxy, sulfo and/or halogen, or are morpholino or 3-carboxy- or 3-carbamoylpyridin-1-yl, and $B_1$ in the radical of formula (4) is a linking group, together with at least one blue dyeing and/or at last one red dyeing dye.

Halogen substituents $R_1$, $R_2$, $R_3$, $R_4$, $R_5$, $R_6$, $R_7$ and $R_8$ in formula (1) are each independently of one another fluoro, bromo or, preferably, chloro.

$R_1$, $R_2$, $R_3$, $R_4$, $R_5$, $R_6$, $R_7$ and $R_8$ in formula (1) and R and R' in formulae (2) to (4) defined as $C_1$-$C_8$alkyl are typically methyl, ethyl, propyl, isopropyl, butyl, sec-butyl, tert-butyl, isobutyl, pentyl, hexyl, heptyl and octyl. Preferably $R_1$, $R_2$, $R_3$, $R_4$, $R_5$, $R_6$, $R_7$, $R_8$, R and R' are $C_1$-$C_4$alkyl.

The substituents R and R' in formulae (2) to (4) as $C_1$-$C_8$alkyl may be substituted, conveniently by $C_1$-$C_4$alkoxy, $C_1$-$C_4$alkoxycarbonyl, hydroxy, halogen, typically chloro or fluoro, carboxy, cyano, sulfo or sulfato. Typical examples are carboxymethyl, $\beta$-carboxyethyl, methoxycarbonylmethyl, ethoxycarbonylmethyl, $\beta$-methoxyethyl, $\beta$-ethoxyethyl, $\beta$-chloroethyl, $\gamma$-chloropropyl, $\beta$-hydroxyethyl, $\beta$-hydroxybutyl, $\beta$-cyanoethyl, sulfomethyl, $\beta$-sulfoethyl, $\beta$-sulfatoethyl.

Preferably R and R' have the same meanings. R and R' are preferably hydrogen or $C_1$-$C_4$alkyl, most preferably hydrogen.

$R_1$, $R_2$, $R_3$, $R_4$, $R_5$, $R_6$, $R_7$ and $R_8$ defined in formula (1) as $C_1$-$C_8$alkoxy are preferably $C_1$-$C_4$alkoxy such as methoxy, ethoxy, propoxy, isopropoxy, butoxy, sec-butoxy, isobutoxy or tert-butoxy.

$R_1$, $R_2$, $R_3$, $R_4$, $R_5$, $R_6$, $R_7$ and $R_8$ defined as $C_2$-$C_6$alkanoylamino in formula (1) are preferably $C_2$-$C_4$alkanoylamino, typically acetylamino or propionylamino. $C_2$-$C_6$Alkanoylamino as $C_2$-$C_6$alkanoylamino which is substituted in the alkyl moiety is typically carboxy- or, preferably, hydroxy-substituted.

$R_1$ and $R_2$ as arylazo in formula (1) are each independently of the other typically naphthylazo or, preferably, phenylazo radicals, each of which radicals may be unsubstituted or further substituted by sulfo, $C_1$-$C_4$alkyl, $C_1$-$C_4$alkoxy and/or halogen. Unsubstituted phenylazo or phenylazo which is substituted by sulfo, methyl, methoxy and/or chloro are preferred.

Typical examples of substituents $Y_1$ in formula (3) and $Y_2$ in formula (4) are hydroxy, methoxy, ethoxy, n- or isopropoxy, chloro, methylthio, ethylthio, amino, methylamino, ethylamino, carboxymethylamino, $\beta$-hydroxyethylamino, N,N-di-$\beta$-hydroxyethylamino, $\beta$-sulfoethylamino, phenylamino, o-, m- or p-methylphenylamino, o-, m- or p-methoxyphenylamino, o-, m- or p-chlorophenylamino, o-, m- or p-sulfophenylamino, 2,4- or 2,5-disulfophenylamino, o-carboxyphenylamino, N-ethyl-N-phenylamino, N-methyl-N-phenylamino and morpholino.

Preferably $Y_1$ and $Y_2$ are each independently of the other chloro, amino, N-mono- or N,N-di-$C_1$-$C_4$alkylamino which are unsubstituted or substituted in the alkyl moiety or moieties by hydroxy, or are phenylamino or morpholino, preferably morpholino or chloro.

Suitable linking groups $B_1$ in formula (4) may conveniently be the radicals of formulae $-NR-(CH_2)_{2-4}-NR'-$, (5)

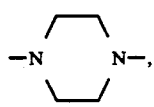 (6)

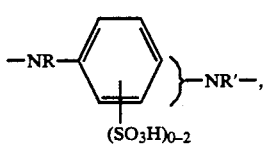 (7)

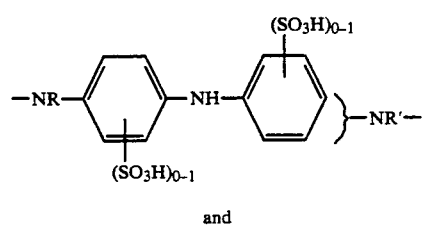 (8)

and

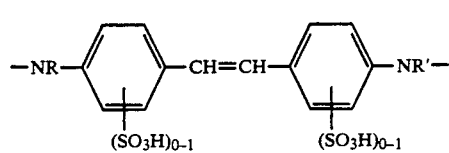 (9)

wherein R and R' have the aforementioned meanings and preferred meanings. Preferably $B_1$ is a radical of formula (6).

It is preferred to use dyes of formula (1), wherein $R_1$, $R_2$, $R_3$, $R_4$, $R_5$, $R_6$, $R_7$ and $R_8$ are hydrogen, $C_1$-$C_4$alkyl, $C_1$-$C_4$alkoxy, $C_2$-$C_4$alkanoylamino, halogen or sulfo. $R_1$, $R_2$, $R_3$ and $R_4$ are preferably hydrogen or sulfo.

It is especially preferred to use dyes of formula (1), wherein $R_1$, $R_2$, $R_3$ and $R_4$ are hydrogen or sulfo, $R_5$, $R_6$, $R_7$ and $R_8$ are hydrogen, $C_1$-$C_4$alkyl, $C_1$-$C_4$alkoxy, $C_2$-$C_4$alkanoylamino, halogen or sulfo, $B_1$ is a radical of formula (6), and $Y_1$ and $Y_2$ are chloro, amino, N-mono- or N,N-di-$C_1$-$C_4$alkylamino which is unsubstituted or substituted in the alkyl moiety or moieties by hydroxy, or are phenylamino or morpholino, preferably morpholino or chloro.

It is most especially preferred to use as dyes of formula (1) dyes of formula

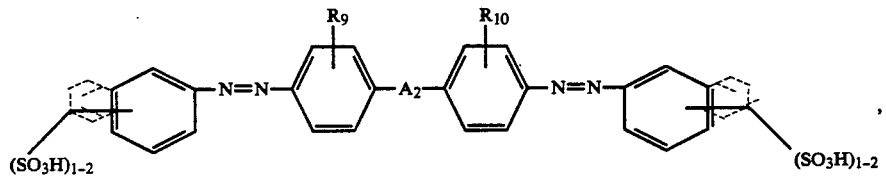 (10)

wherein $R_9$ and $R_{10}$ are hydrogen, $C_1$-$C_4$alkyl, $C_1$-$C_4$alkoxy, $C_2$-$C_4$alkanoylamino, halogen or sulfo, preferably hydrogen or $C_2$-$C_4$alkanoylamino, and $A_2$ is a radical of formula

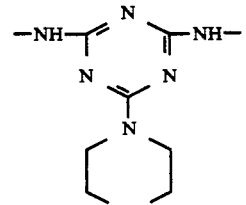

or

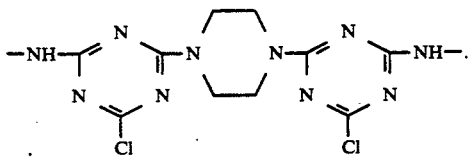

Dyes meriting particular interest as dyes of formula (1) for the process of this invention are the dyes of formulae

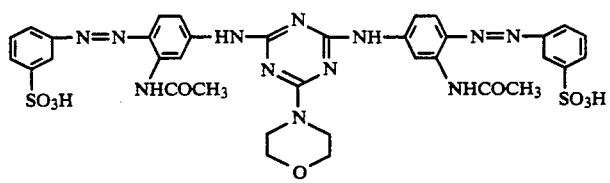 (11)

and

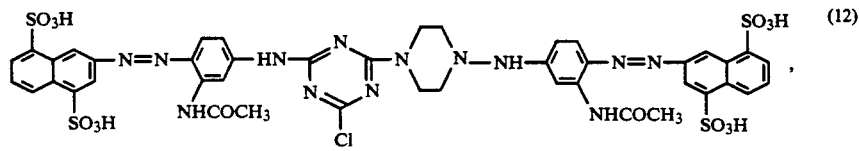 (12)

especially the dye of formula (11).

As blue dyeing dyes it is preferred to use in the inventive process at least one dye of formulae (13), (14) and (15)

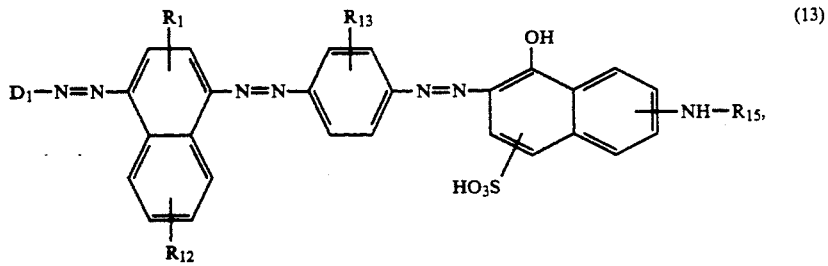

wherein $D_1$ is unsubstituted or substituted phenyl or naphthyl, $R_{11}$, $R_{12}$, $R_{13}$ and $R_{14}$ are hydrogen, unsubstituted or substituted $C_1$-$C_8$alkyl or $C_1$-$C_8$alkoxy, halogen, carboxy, sulfo, ureido or $C_2$-$C_6$alkanoylamino which is unsubstituted or substituted in the alkyl moiety and $R_{15}$ is hydrogen, unsubstituted or substituted $C_1$-$C_8$alkyl, $C_2$-$C_6$alkanoyl which is unsubstituted or substituted in the alkyl moiety, or phenyl or benzoyl which are unsubstituted or substituted in the phenyl ring

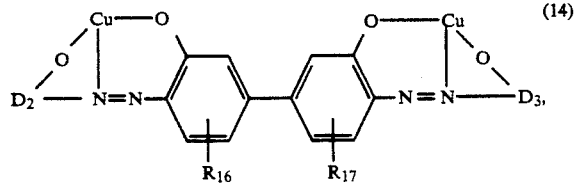

wherein $D_2$ and $D_3$ are unsubstituted or substituted naphthyl, and $R_{16}$ and $R_{17}$ are hydrogen, unsubstituted or substituted $C_1$-$C_8$alkyl or $C_1$-$C_8$alkoxy, halogen, carboxy, sulfo, ureido or $C_2$-$C_6$alkanoylamino which is unsubstituted or substituted in the alkyl moiety, are preferably $C_1$-$C_4$alkyl, typically methyl, ethyl, propyl, isopropyl, butyl, sec-butyl, tert-butyl or isobutyl, as well as the radicals substituted by e.g. $C_1$-$C_4$alkoxy, $C_1$-$C_4$alkoxycarbonyl, hydroxy, halogen such as chloro or fluoro, carboxy, cyano, sulfo or sulfato.

$R_{11}$, $R_{12}$, $R_{13}$ and $R_{14}$ in formula (13), $R_{16}$ and $R_{17}$ in formula (14) and $R_{18}$, $R_{19}$ and $R_{20}$ in formula (15) defined as unsubstituted or substituted $C_1$-$C_8$alkoxy are preferably $C_1$-$C_4$alkoxy, typically methoxy, ethoxy, propoxy, isopropoxy, butoxy, sec-butoxy, isobutoxy or tert-butoxy, as well as the hydroxy- or carboxy-substituted radicals.

$R_{11}$, $R_{12}$, $R_{13}$ and $R_{14}$ in formula (13), $R_{16}$ and $R_{17}$ in formula (14) and $R_{18}$, $R_{19}$ and $R_{20}$ in formula (15) defined as $C_2$-$C_6$alkanoylamino are preferably $C_2$-$C_4$alkanoylamino, typically acetylamino or propionylamino. $C_2$-$C_6$Alkanoylamino which is substituted in the alkyl moiety may suitably by hydroxy-substituted.

$R_{15}$ as $C_2$-$C_6$alkanoyl in formula (13) is preferably $C_2$-$C_4$alkanoyl, typically acetyl or propionyl. $C_2$-$C_6$Alkanoyl which is substituted in the alkyl moiety may suitably be hydroxy-substituted.

The substituents $D_1$ defined as phenyl or naphthyl,

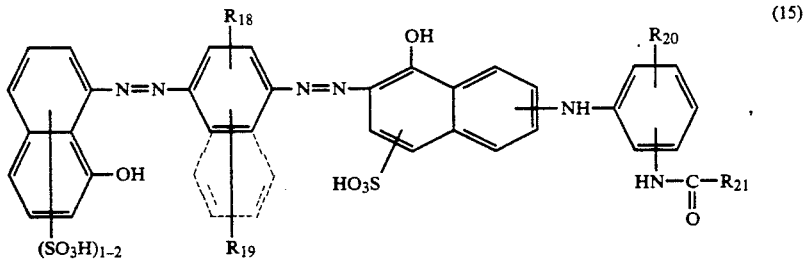

wherein $R_{18}$, $R_{19}$ and $R_{20}$ are hydrogen, unsubstituted or substituted $C_1$-$C_8$alkyl or $C_1$-$C_8$alkoxy, halogen, carboxy, sulfo, ureido or $C_2$-$C_6$alkanoylamino which is unsubstituted or substituted in the alkyl moiety, and $R_{21}$ is unsubstituted or substituted $C_1$-$C_8$alkyl or phenyl.

Halogen substituents $R_{11}$, $R_{12}$, $R_{13}$ and $R_{14}$ in formula (13), $R_{16}$ and $R_{17}$ in formula (14) and $R_{18}$, $R_{19}$ and $R_{20}$ in formula (15) are each independently of one another typically fluoro, bromo or, preferably, chloro.

$R_{11}$, $R_{12}$, $R_{13}$, $R_{14}$ and $R_{15}$ in formula (13), $R_{16}$ and $R_{17}$ in formula (14) and $R_{18}$, $R_{19}$, $R_{20}$ and $R_{21}$ in formula (15) defined as unsubstituted or substituted $C_1$-$C_8$alkyl $D_2$ and $D_3$ as naphthyl, $R_{15}$ as phenyl or benzoyl as well as $R_{21}$ as phenyl may be unsubstituted or substituted. Typical examples of substituents are halogen, amino, sulfo, carboxy, ureido, $C_2$-$C_4$alkanoylamino which may be further substituted in the alkyl moiety by hydroxy, $C_1$-$C_4$alkyl, $C_1$-$C_4$alkoxy which may be further substituted by hydroxy or carboxy, as well as benzoylamino or phenylamino which may be further substituted in the phenyl ring by carboxy, halogen, sulfo, $C_1$-$C_4$alkyl or $C_1$-$C_4$alkoxy.

As blue dyeing dyes it is preferred to use for the inventive process at least one dye of formulae

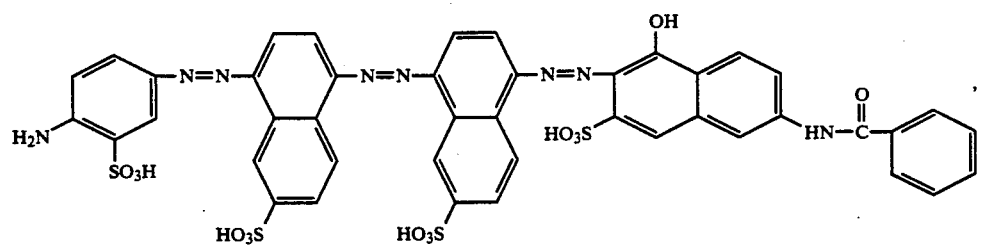  (16)
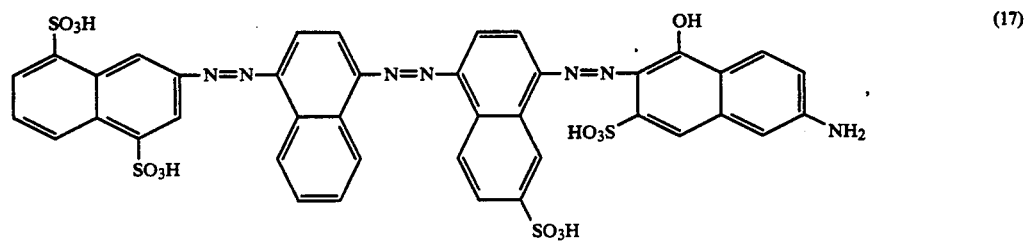  (17)
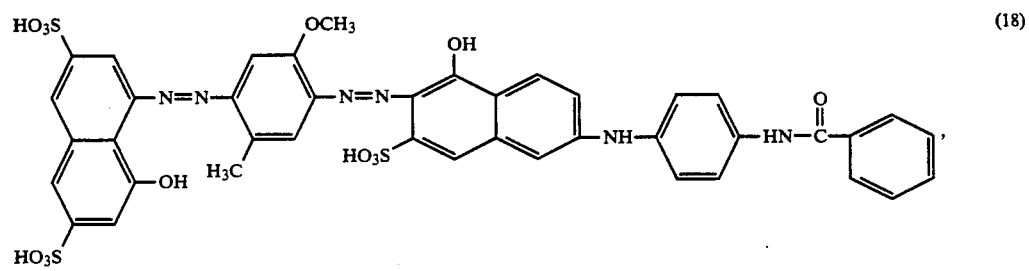  (18)
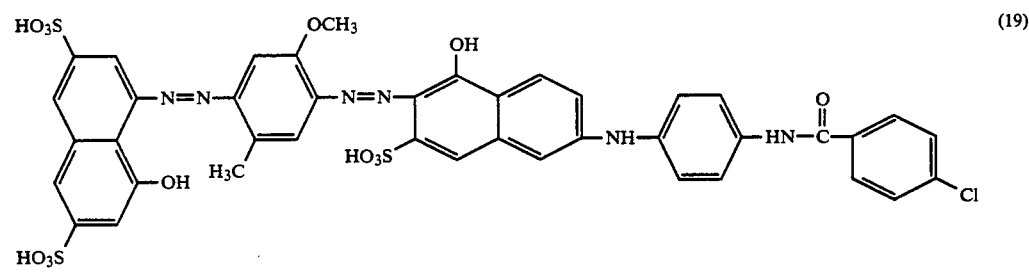  (19)
and
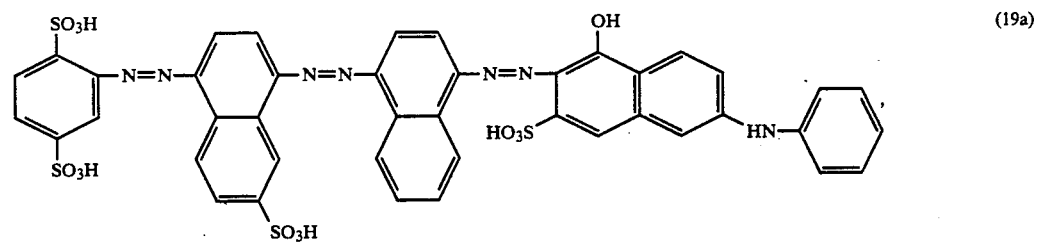  (19a)
especially the dye of formula (16).
As red dyeing dyes it is preferred to use for the inventive process at least one dye of formulae (20), (21), (22), (23) and (24)

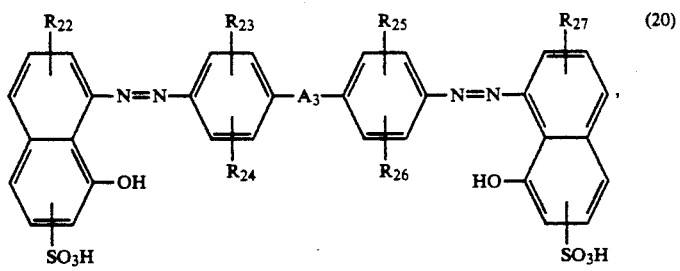
(20)

wherein $R_{22}$, $R_{23}$, $R_{24}$, $R_{25}$, $R_{26}$ and $R_{27}$ are hydrogen, unsubstituted or substituted $C_1$–$C_8$alkyl or $C_1$–$C_8$alkoxy, halogen, carboxy, sulfo, ureido or $C_2$–$C_6$alkanoylamino which is unsubstituted or substituted in the alkyl moiety, and $A_3$ is a radical of formula

—NH—,

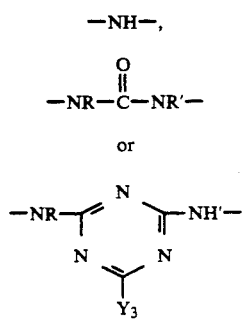

wherein R and R' are hydrogen or unsubstituted or substituted $C_1$–$C_8$alkyl, and $Y_3$ is hydroxy, $C_1$–$C_4$alkoxy, chloro, bromo, $C_1$–$C_4$alkylthio, amino, N-mono- or N,N-di-$C_1$–$C_4$alkylamino which is unsubstituted or substituted in the alkyl moiety or moieties by hydroxy, sulfo, carboxy or $C_1$–$C_4$alkoxy, cyclohexylamino, phenylamino or N-$C_1$–$C_4$alkyl-N-phenylamino which are unsubstituted or substituted in the phenyl nucleus by $C_1$–$C_4$alkyl, $C_1$–$C_4$alkoxy, carboxy, sulfo and/or halogen, or are morpholino or 3-carboxy- or 3-carbamoyl-pyridin-1-yl,

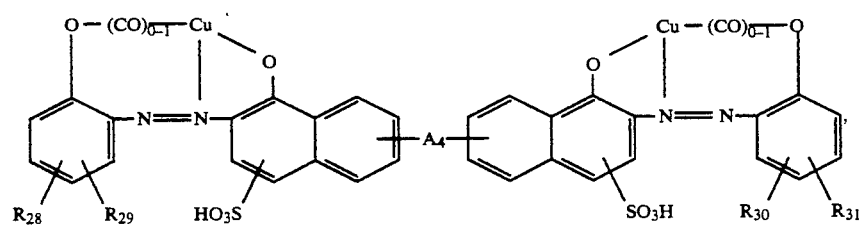
(21)

wherein $R_{28}$, $R_{29}$, $R_{30}$ and $R_{31}$ are hydrogen, unsubstituted or substituted $C_1$–$C_8$alkyl or $C_1$–$C_8$alkoxy, halogen, carboxy, sulfo, ureido, sulfamoyl or $C_2$–$C_6$alkanoylamino which is unsubstituted or substituted in the alkyl moiety, and $A_4$ is as defined for $A_3$ under formula (20),

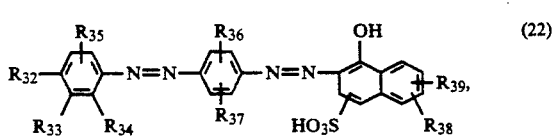
(22)

wherein $R_{32}$, $R_{33}$, $R_{34}$, $R_{35}$, $R_{36}$, $R_{37}$ and $R_{38}$ are hydrogen, unsubstituted or substituted $C_1$–$C_8$alkyl or $C_1$–$C_8$alkoxy, halogen, carboxy, sulfo, ureido or $C_2$–$C_6$alkanoylamino which is unsubstituted or substituted in the alkyl moiety, and $R_{39}$ is benzoylamino or benzoylamino which is substituted in the phenyl ring, or a radical of formula

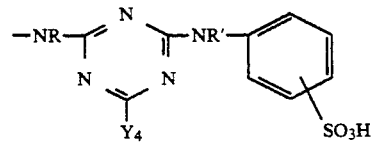

which may be further substituted in the phenyl ring, wherein R and R' are hydrogen or unsubstituted or substituted $C_1$–$C_8$alkyl and $Y_4$ is as defined for $Y_3$ under formula (20),

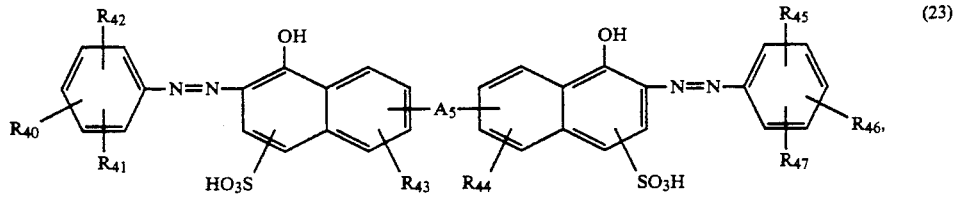
(23)

wherein $R_{40}$, $R_{41}$, $R_{42}$, $R_{43}$, $R_{44}$, $R_{45}$, $R_{46}$ and $R_{47}$ are hydrogen, unsubstituted or $C_1$–$C_8$alkyl or $C_1$–$C_8$alkoxy, halogen, carboxy, sulfo, ureido or $C_2$–$C_6$alkanoylamino which is unsubstituted or substituted in the alkyl moiety, and $R_{40}$ and $R_{46}$ may additionally be phenylazo or phenylazo which is substituted in the phenyl ring, and $A_5$ is as defined for $A_3$ under formula (20), or is a radical of formula

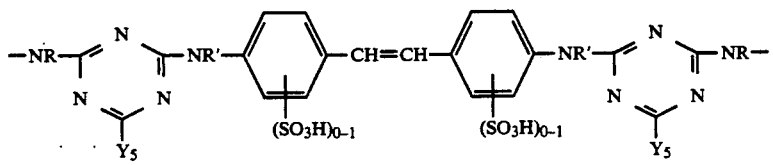

wherein R and R' are hydrogen or unsubstituted or substituted $C_1$-$C_8$alkyl and $Y_5$ is as defined for $Y_3$ under formula (20),

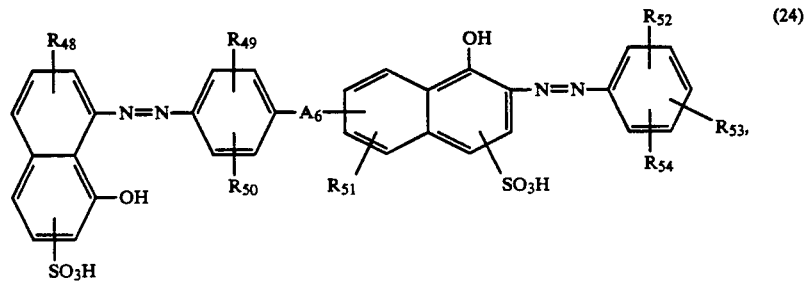

wherein $R_{48}$, $R_{49}$, $R_{50}$, $R_{51}$, $R_{52}$, $R_{53}$ and $R_{54}$ are hydrogen, unsubstituted or substituted $C_1$-$C_8$alkyl or $C_1$-$C_8$alkoxy, halogen, carboxy, sulfo, ureido or $C_2$-$C_6$alkanoylamino which is unsubstituted or substituted in the alkyl moiety, and $A_6$ is as defined for $A_3$ under formula (20).

Halogen substituents $R_{22}$, $R_{23}$, $R_{24}$, $R_{25}$, $R_{26}$ and $R_{27}$ in formula (20), $R_{28}$, $R_{29}$, $R_{30}$ and $R_{31}$ in formula (21), $R_{32}$, $R_{33}$, $R_{34}$, $R_{35}$, $R_{36}$, $R_{37}$ and $R_{38}$ in formula (22), $R_{40}$, $R_{41}$, $R_{42}$, $R_{43}$, $R_{44}$, $R_{45}$, $R_{46}$ and $R_{47}$ in formula (23), and $R_{48}$, $R_{49}$, $R_{50}$, $R_{51}$, $R_{52}$, $R_{53}$ and $R_{54}$ in formula (24) are each independently of one another typically fluoro, bromo or, preferably, chloro.

Unsubstituted or substituted $C_1$-$C_8$alkyl cited above as substitutent of the dyes of formulae (20) to (24) as well as suitable value for R and R' is preferably $C_1$-$C_4$alkyl, typically methyl, ethyl, propyl, isopropyl, butyl, sec-butyl, tert-butyl or isobutyl, as well as the radicals substituted by e.g. $C_1$-$C_4$alkoxy, $C_1$-$C_4$alkoxycarbonyl, hydroxy, halogen, typically chloro or fluoro, carboxy, cyano, sulfo or sulfato.

R and R' have the previously given meanings and preferred meanings.

Unsubstituted or substituted $C_1$-$C_8$alkoxy cited above as substituents of the dyes of formulae (20) to (24) is preferably $C_1$-$C_4$alkoxy, typically methoxy, ethoxy, propoxy, isopropoxy, butoxy, sec-butoxy, isobutoxy or tert-butoxy, as well as the hydroxy- or carboxy-substituted radicals.

$C_2$-$C_6$Alkanoylamino cited above as substituent of the dyes of formulae (20) to (24) is preferably $C_2$-$C_4$alkanoylamino, typically acetylamino or propionoylamino. $C_2$-$C_6$alkanoylamino which is substituted in the alkyl moiety may suitably be hydroxy-substituted.

$R_{39}$ as benzoylamino or as radical of formula

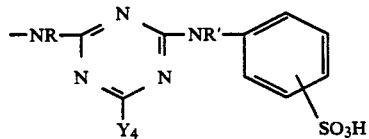

as well as $R_{40}$ and $R_{46}$ as phenylazo may be unsubstituted or substituted in the phenyl ring. Typical examples of substituents are halogen, amino, sulfo, carboxy, ureido, $C_2$-$C_4$alkanoylamino which may be further substituted in the alkyl moiety by hydroxy, $C_1$-$C_4$alkyl, $C_1$-$C_4$alkoxy which may be further substituted by hydroxy, as well as benzoylamino or phenylamino which may be further substituted in the phenyl ring by carboxy, halogen, sulfo, $C_1$-$C_4$alkyl or $C_1$-$C_4$alkoxy. Preferred substituents are halogen, sulfo or $C_1$-$C_4$alkyl.

$Y_3$, $Y_4$ and $Y_5$ have the same meanings and preferred meanings as given above for $Y_1$ and $Y_2$.

As red dyeing dyes it is preferred to use for the inventive process at least one dye of formula

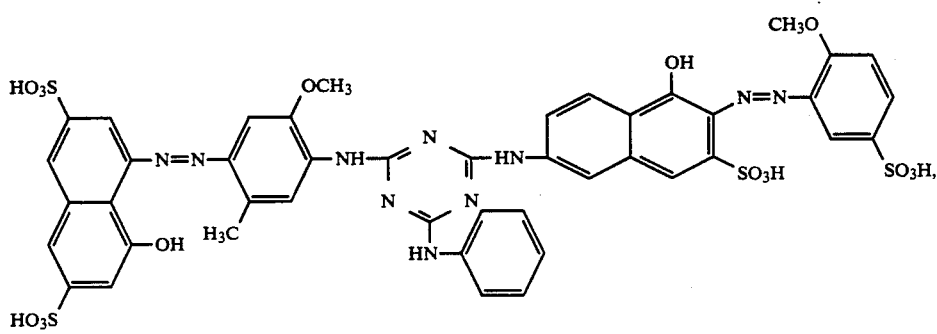

-continued

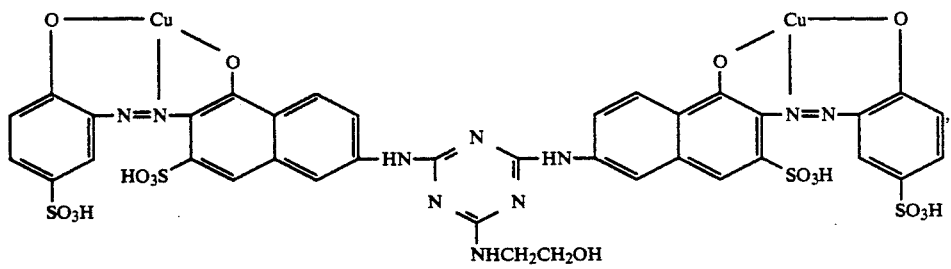

(26)

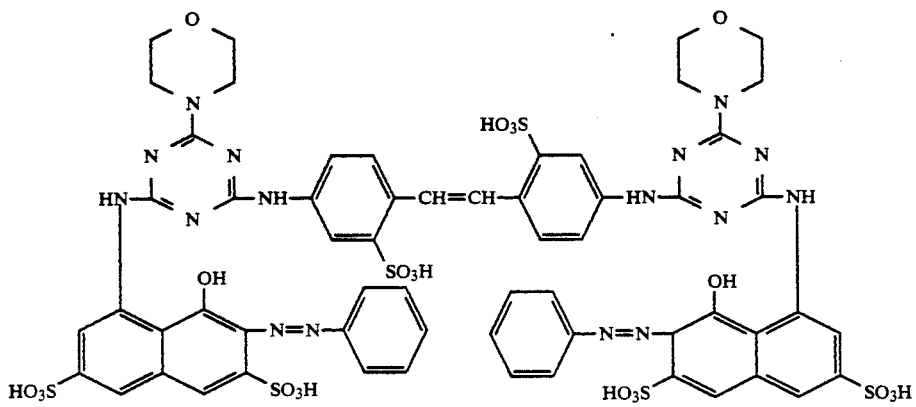

(27)

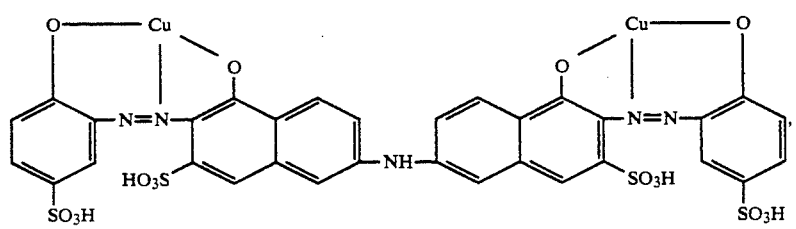

(28)

and

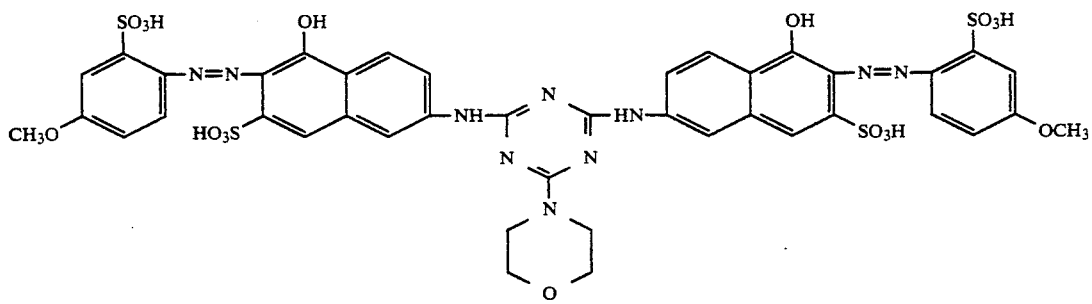

(29)

especially a dye of formula (25).

It is particularly preferred to use at least one yellow or orange dyeing dye of formula (1) together with at least one blue dyeing dye of formulae (13) to (15) and/or at least one red dyeing dye of formulae (20) to (24). As blue dyeing dyes those of formulae (13) and (15), and as red dyeing dyes those of formulae (21), (23) and (24), merit particular interest.

In the process of this invention it is especially preferred to use at least one yellow or orange dyeing dye of formula (1), preferably a yellow or orange dyeing dye of formulae (11) and (12), together with at least one blue dyeing dye of formulae (16), (17), (18), (19) and (19a) and/or at least one red dyeing dye of formulae (25) to (29), the blue dyeing dye being preferably the dye of formula (16) and the red dyeing dye preferably being the dye of formula (25).

A particularly important embodiment of the process of this invention comprises using a yellow or orange dyeing dye of formula (11) together with a blue dyeing dye of formula (16) and/or a red dyeing dye of formula (25).

The process of this invention is particularly suitable for trichromatic dyeing or printing using at least one yellow or orange dyeing dye of formula (1) together with at least one blue dyeing dye and at least one red dyeing dye. With respect to the dyes used for trichromatic dyeing or printing, the meanings and preferred meanings previously given above apply.

By trichromatic dyeing is meant the additive blending of suitably chosen yellow or orange, red and blue dyeing dyes in the concentrations necessary for obtaining the desired shade.

The yellow or orange dyeing dyes of formula (1), the blue dyeing dyes of formulae (13) to (15) and the red dyeing dyes of formulae (20) to (24) are known or they can be prepared by methods analogous to those for obtaining known dyes.

With respect to their tinctorial properties, the yellow or orange dyeing dyes of formula (1), the blue dyeing dyes of formulae (13) to (15) and the red dyeing dyes of formulae (20) to (24) used in the process of this invention may be termed direct dyes (C.I. direct dyes).

The yellow or orange dyeing dyes of formula (1), the blue dyeing dyes and the red dyeing dyes used in the inventive process are either in the form of their free sulfonic acid or, preferably, as salts thereof, typically as alkali metal salts, alkaline earth metal salts or ammonium salts or as salts of an organic amine. Typical examples are the sodium, potassium, lithium or ammonium salts or the salt of triethanolamine.

For the inventive process, the concentrations in which the yellow or orange dyeing dyes of formula (1), the blue dyeing dyes and the red dyeing dyes are used in the dyebaths or printing pastes vary, depending on the desired depth of shade. In general, concentrations of 0.01 to 10 percent by weight, preferably of 0.1 to 6 percent by weight, based on the material to be dyed, have been found useful.

Suitable hydroxyl group containing fibre materials, especially textile materials, which can be dyed or printed by the process of the invention are typically those made from cellulosic fibres such as cotton, linen or hemp, preferably cotton, as well as regenerated cellulose fibres such as viscose rayon, rayon or viscose staple fibres.

Hydroxyl group containing fibre materials will also be understood as meaning blends containing such fibre materials. Suitable blends are typically those containing, in addition to cellulosic fibre materials, natural or synthetic polyamide fibre materials or acrylic or polyester fibre materials. Exemplary of such blends are wool/cotton, polyamide/cotton, acrylic/cotton or, preferably, polyester/cotton blends.

The textile materials can be in any form of presentation, typically as filaments, yarn, woven or knitted goods.

The process of the invention is suitable for dyeing by the exhaust or the pad method as well as for printing by the standard methods employed.

Dyeing by the exhaust method is preferred. Exhaust dyeing is normally carried out in the temperature range from 60° to 110° C., preferably from 9° to 105° C., in the pH range from 6 to 10, preferably from 7 to 9, preferably from an aqueous liquor at a liquor to goods ratio of 1:5 to 1:80, most preferably of 1:10 to 1:20.

A particularly preferred embodiment of the inventive process comprises dyeing in the presence of a salt, conveniently in the presence of an alkali metal halide, preferably an alkali metal chloride, or of an alkali metal sulfate. A portion of the salt is preferably added at the start of the dyeing process and then a further portion is added, altogether or in increments, shortly before or after the dyeing temperature has been reached. The amount of salt added at the start of the dyeing process is normally from 5 to 40% of the total amount of salt added in the course of the dyeing process. The amount of salt added shortly before or after the dyeing temperature has been reached is thus 60 to 95% of the total amount of salt added in the course of the dyeing process. The temperature range shortly before dyeing temperature is reached will be understood as meaning the heating up range for attaining the dyeing temperature, typically the temperature range from 80° to 98° C. It is preferred to add the salt direct when the dyeing temperature is reached. In this embodiment of the inventive process it has been found useful to add a total amount of salt depending on the total amount of the dyes used. Normally the total amount of salt added will increase with the total amount of the dyes. The amount of salt added is typically 6 to 12 g/l up to a total amount of 1% of dye, typically 12 to 20 g/l up to a total amount of 2% of dye, and typically 20 to 40 g/l above a total amount of 2% of dye. The dye concentrations are here expressed in percentages by weight, based on the fibre material, and normally correspond to the dyes obtained after their synthesis, conveniently by salting out.

Dyeing by the exhaust method is preferred for this embodiment of the inventive process. It is also possible to dye textile fibre materials made from blends, typically from wool/cotton, polyamide/cotton, acrylic/cotton or, preferably polyester/cotton blends by one bath processes and in the presence of dyes for the other different type of fibre component.

It is thus possible to dye blends of synthetic fibres and cellulosic fibre materials, preferably polyester/cotton blends, in the presence of a disperse dye for the synthetic fibre component under the dyeing conditions for synthetic fibres. Suitable synthetic fibres are preferably polyester fibres. If dyeing is carried out in this embodiment of the process in the presence of a salt such as an alkali metal halide or an alkali metal sulfate, then it is preferred to add the total amount of salt at the start of the dyeing process.

The dyes used for the inventive process have good compatibility with other dyes, especially disperse dyes. They have a sufficient high-temperature stability and can hence be used for dyeing under the dyeing conditions for polyester fibres, i.e. in the temperature range from about 100° to 150° C., preferably from 120° to 130° C., from an aqueous liquor and in the pH range from about 4 to 7.5, preferably from 5 to 7.

It is thus possible to use conventional disperse dyes together with the dyes eligible for the process of this invention in a single step, one bath process for dyeing polyester/cotton blends, in which process level and fast dyeings are obtained with the respective dye on both fibre components. By using a disperse dye of the same shade as the dye mixture used for the inventive process, it is also possible to obtain solid shade dyeings.

The dyeing of textile blends, typically blends of polyester and cellulosic fibres, can be greatly simplified in this embodiment of the inventive process. The conventional practice of dyeing each component of a fibre blend in a separate procedure under different dyeing conditions is therefore no longer necessary.

The dyes used for the process of this invention are distinguished by level colour build-up while having consistency of shade at different concentrations and good compatibility with other dyes. The dyeings and prints obtained have good fibre levelness and surface levelness and good allround fastness properties, especially good fastness to rubbing, wet treatments, wet rubbing, perspiration and light. Where necessary, the wetfastness properties, especially the washfastness, can be further substantially enhanced by an aftertreatment with fixing alkalies. Examples of suitable fixing alkalies are those described in EP-A-250 265 and EP-A-438 380.

The invention is illustrated by the following Examples in which parts and percentages are by weight, unless otherwise indicated. The relationship between parts by weight and parts by volume is the same as that between the kilogram and the litre.

EXAMPLE 1

12.5 parts of non-mercerised cotton fabric are wetted with one part of a non-ionic wetting agent at 80° C. The pretreated cotton fabric is pinched off and put into a warm dye solution of 40° C. which contains, in deionised water, 0.4% of the yellow dyeing dye of formula ness, are enhanced by subjecting the dyed cotton fabric to an aftertreatment with a cationic fixing agent.

EXAMPLES 2 to 26

The procedure of Example 1 is repeated, but replacing 0.4% of the yellow dyeing dye of formula (101), 0.3% of the red dyeing dye of formula (102) and 0.3% of the blue dyeing dye of formula (103) with the dyes listed in column 2 of the following Table in the given concentrations, and using instead of 3 g/l sodium sulfate the amount of sodium sulfate A indicated in column 3, and instead of 12 g/l of sodium sulfate the amount of sodium sulfate B indicated in column 4, to give a cotton fabric dyed in the shade indicated in column 5. The dyes of formulae (104) to (111) specified in column 2 are

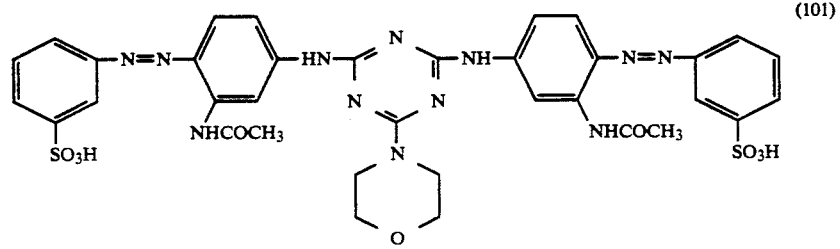

(101)

0.3% of the red dyeing dye of formula listed after the Table.

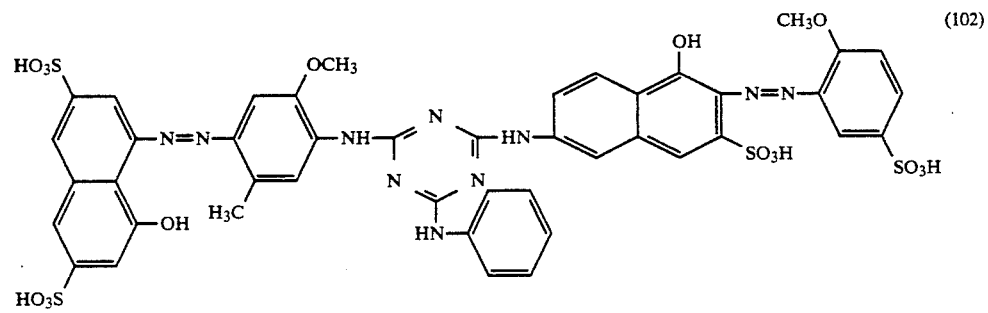

(102)

and 0.3% of the blue dyeing dye of formula

TABLE

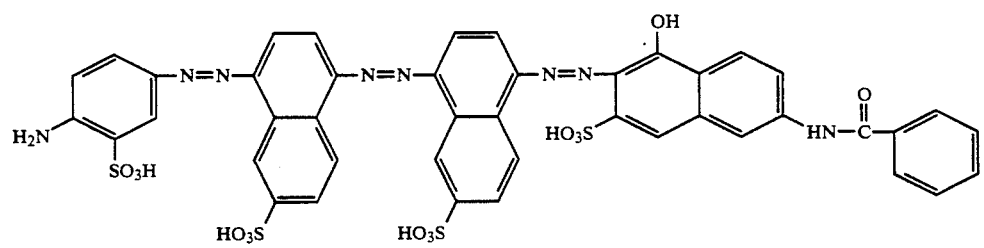

(103)

based on the weight of the cotton fabric, at a liquor ratio of 1:20. The dyebath is kept for 5 minutes at a temperature of 40° C., then 3 g/l of sodium sulfate are added and, after a further 5 minutes, the temperature of the dyebath is raised to boiling temperature at a heating-up rate of 1.5° C./minute. When boiling temperature is reached, 12 g/l of sodium sulfate are added and the dyebath is kept for 45 minutes at c. 98° C. Then the dyebath is cooled to c. 80°-85° C. at a cooling rate of 1° C./minute and kept for 15 minutes at this temperature. The dyed fabric is then removed from the bath, washed twice for 5 minutes with water, pinched off and dried in a drying oven at c. 80°-90° C. The cotton is dyed in a level ochre brown shade of good allround fastness properties. The fastness properties, especially the washfast-

| Ex. | Dyes | Sodium sulfate A | Sodium sulfate B | Shade |
|---|---|---|---|---|
| 2 | 0.4% of the dye of formula 101) 0.3% of the dye formula (104) 0.3% of the dye of formula (103) | 1.5 g/l | 13.5 g/l | olive green |
| 3 | 0.4% of the dye of formula (101) 0.3% of the dye of formula (102) 0.1% of the dye of formula (105) | 1.6 g/l | 9.2 g/l | ochre brown |
| 4 | 0.4% of the dye of | 3.2 g/l | 9.7 g/l | brown |

TABLE-continued

| Ex. | Dyes | Sodium sulfate A | Sodium sulfate B | Shade |
|---|---|---|---|---|
| | formula (101) 0.3% of the dye of formula (102) 0.2% of the dye of formula (106) | | | |
| 5 | 1.0% of the dye of formula (101) 0.5% of the dye of formula (103) | 3.0 g/l | 12,6 g/l | olive green |
| 6 | 1.0% of the dye of formula (101) 0.5% of the dye of formula (102) | 3.0 g/l | 12.6 g/l | orange |
| 7 | 0.4% of the dye of formula (101) 0.3% of the dye of formula (107) 0.3% of the dye of formula (103) | 2.0 g/l | 13.0 g/l | grey olive |
| 8 | 0.4% of the dye of formula (101) 0.3% of the dye of formula (107) 0.1% of the dye of formula (105) | 3.2 g/l | 7.6 g/l | grey olive |
| 9 | 0.4% of the dye of of formula (101) 0.3% of the dye of formula (107) 0.2% of the dye of formula (106) | 2.5 g/l | 10.4 g/l | brown olive |
| 10 | 1.0% of the dye of formula (101) 0.5% of the dye of formula (107) | 3.2 g/l | 12.4 g/l | orange |
| 11 | 0.4% of the dye of formula (101) 0.3% of the dye of formula (108) 0.3% of the dye of formula (103) | 3.0 g/l | 12.0 g/l | grey brown |
| 12 | 0.4% of the dye of formula (101) 0.3% of the dye of formula (108) 0.1% of the dye of formula (105) | 2.1 g/l | 8.5 g/l | brown |
| 13 | 0.4% of the dye of formula (101) 0.3% of the dye of formula (108) 0.2% of the dye of formula (106) | 2.5 g/l | 10.4 g/l | brown |
| 14 | 1.0% of the dye of formula (101) 0.5% of the dye of formula (108) | 3.2 g/l | 12.4 g/l | brown orange |
| 15 | 0.5% of the dye of formula (101) 0.5% of the dye of formula (108) 0.5% of the dye of formula (107) | 4 g/l | 15 g/l | brown orange |
| 16 | 0.5% of the dye of formula (101) 0.5% of the dye of formula (103) 0.5% of the dye of formula (107) | 5 g/l | 15 g/l | greenish grey olive |
| 17 | 0.5% of the dye of formula (101) 0.5% of the dye of formula (109) 0.5% of the dye of of formula (107) | 6 g/l | 13 g/l | brown violet |
| 18 | 0.5% of the dye of formula (101) 0.5% of the dye of formula (110) 0.5% of the dye of formula (107) | 7 g/l | 11 g/l | orange |
| 19 | 0.5% of the dye of formula (101) 0.5% of the dye of formula (111) 0.5% of the dye of formula (107) | 3.5 g/l | 14.5 g/l | grey olive |
| 20 | 0.5% of the dye of der Formel (101) 0.5% of the dye of formula (105) 0.5% of the dye of formula (107) | 3 g/l | 16 g/l | greenish grey olive |
| 21 | 0.5% of the dye of formula (101) 0.5% of the dye of formula (108) 0.5% of the dye of formula (107) | 4 g/l | 14 g/l | red orange |
| 22 | 0.5% of the dye of formula (101) 0.5% of the dye of formula (108) 0.5% of the dye of formula (110) | 4 g/l | 14.5 g/l | red orange |
| 23 | 0.5% of the dye of formula (101) 0.5% of the dye of formula (108) 0.5% of the dye of formula (111) | 3.5 g/l | 15.5 g/l | grey brown |
| 24 | 0.5% of the dye of formula (101) 0.5% of the dye of formula (108) 0.5% of the dye of formula (105) | 4.5 g/l | 14.5 g/l | anthracite |
| 25 | 0.5% of the dye of formula (101) 0.5% of the dye of formula (108) 0.5% of the dye of formula (109) | 5 g/l | 13 g/l | aubergine |
| 26 | 0.5% of the dye of formula (101) 0.5% of the dye of formula (108) 0.5% of the dye of formula (103) | 6 g/l | 13 g/l | grey brown |

List of dyes of formulae (104) to (111) indicated in the above Table:

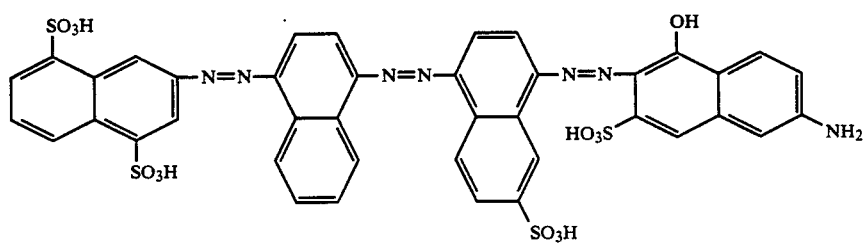

(104)

-continued
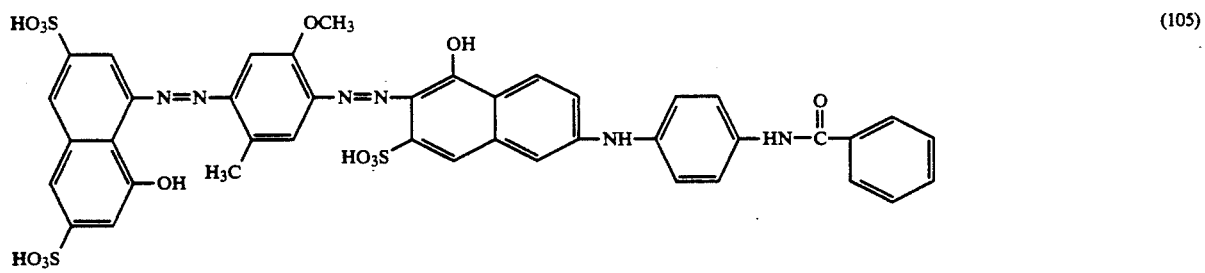  (105)
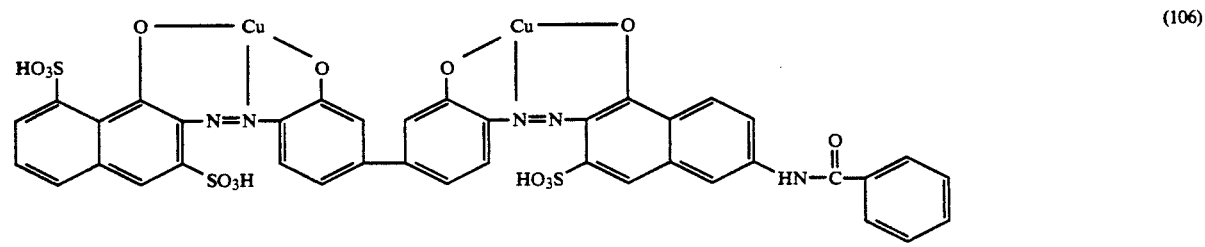  (106)
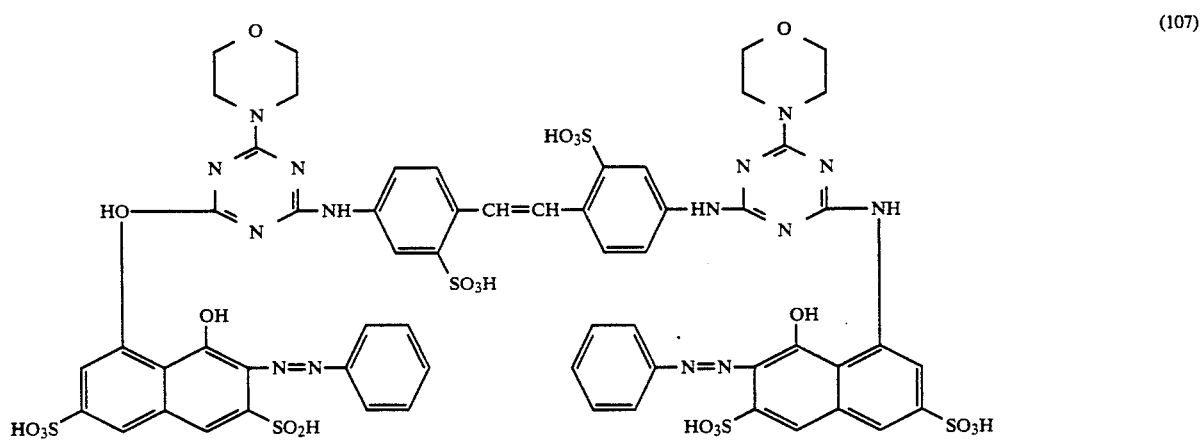  (107)
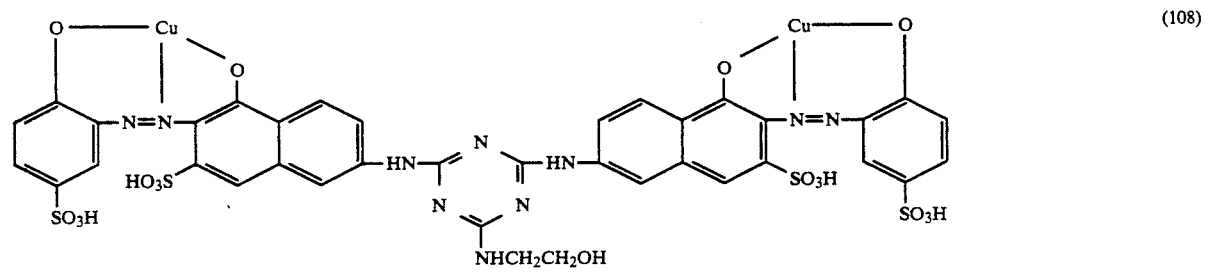  (108)
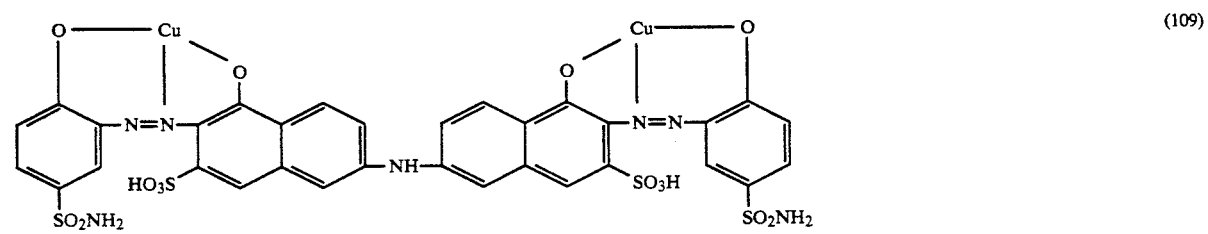  (109)

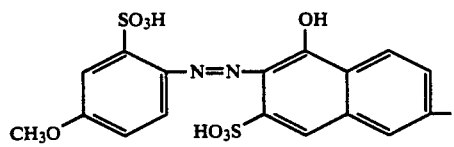 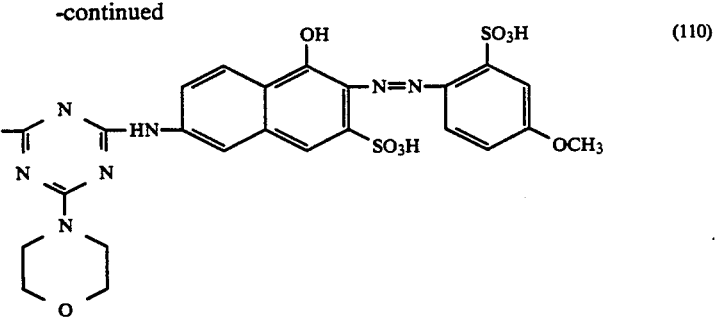 (110)

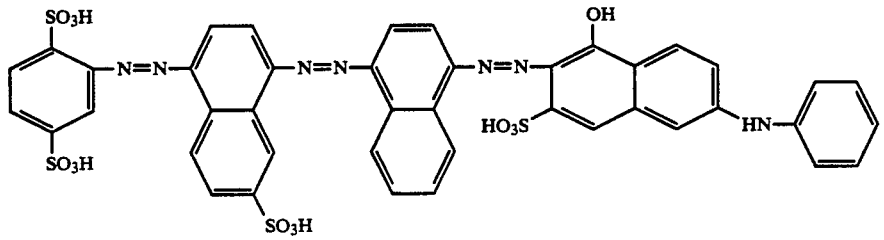 (111)

EXAMPLE 27

250.8 parts of thoroughly wetted polyester/cotton knit goods comprising 30 parts of polyester and 70 parts of cotton per 100 parts are put at 60° C. into a high-temperature jet dyeing machine. The liquor ratio is 1:7. The following auxiliaries are then added to the dyebath:

0.75 g/l of a commercially available lubricant (ox-

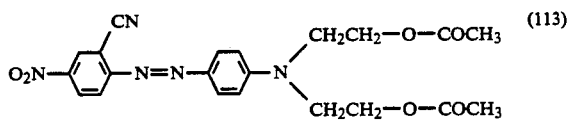 (113)

and 0.17 part of a blue dyeing disperse dye of formula

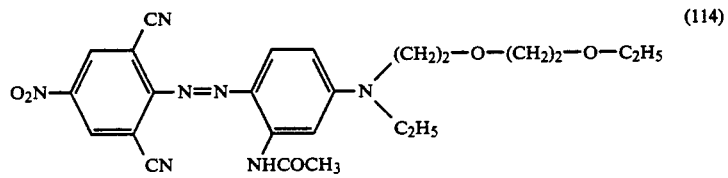 (114)

yalkylene-polyester condensate type),
0.3 g/l of a maleate-based silicone-free penetration accelerator,
1 g/l of a levelling assistant (ammonium salt of an acid-modified polyhydroxy alkylene glycol ether),
2 g/l of monosodium dihydrogen phosphate buffer,
2 g/l of sodium-m-nitrobenzenesulfonate and
10 g/l of sodium sulfate.

The pH is adjusted to 5 with acetic acid. The dye liquor is kept for 5 minutes at 60° C. and then a mixture of 0.74 part of the dye of formula (101), 0.45 part of the dye of formula (102), 0.48 part of the dye of formula (103), 0.21 part of a yellow dyeing disperse dye of formula

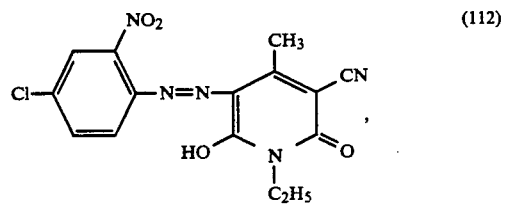 (112)

0.19 part of a red dyeing disperse dye of formula are added to the dyebath. The dyebath is then heated to 130° C. at a heating-up rate of 2° C./minute, kept at this temperature for 30 minutes and thereafter cooled to 80° C. at a cooling rate of 1.5° C./minute. The dyebath is kept for 15 minutes at 80° C., then drained off and the dyed material is washed twice for 5 minutes with warm water of 30° C. The dyeing is finished by drying in conventional manner or treated with a cationic aftertreating agent. Suitable aftertreating agents include those based on polymerised quaternary diallylammonium compounds, typically the compounds described in EP-A-438 380. The material is dyed in a light olive brown shade of excellent levelness.

What is claimed is:

1. A process for dyeing or printing a hydroxyl group containing fibre material, which comprises applying a mixture of dyes to the material, wherein said mixture of dyes is a dichromatic mixture of dyes comprising at least one yellow or orange dyeing dye and at least one blue dyeing or at least one red dyeing dye, or said mixture of dyes is a trichromatic mixture of dyes comprising at least one yellow or orange dyeing dye, at least one blue dyeing dye and at least one red dyeing dye, wherein the blue dyeing dye is a blue dyeing sulfonated azo dye or a blue dyeing azo copper complex dye, said red dyeing dye is a red dyeing sulfonated azo dye or a red dyeing azo copper complex dye and said yellow or orange dyeing dye is a dye of the formula

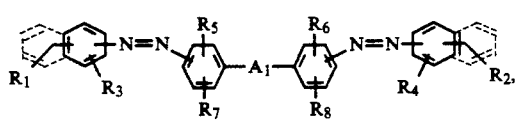 (1)

wherein $R_1$ and $R_2$ are hydrogen, $C_1$-$C_8$alkyl, $C_1$-$C_8$alkoxy, halogen, carboxy, sulfo, ureido, $C_2$-$C_6$alkanoylamino which is unsubstituted or substituted in the alkyl moiety, or unsubstituted or substituted arylazo, $R_3$, $R_4$, $R_5$, $R_6$, $R_7$ and $R_8$ are hydrogen, $C_1$-$C_8$alkyl, $C_1$-$C_8$alkoxy, halogen, carboxy, sulfo, ureido or $C_2$-$C_6$alkanoylamino which is unsubstituted or substituted in the alkyl moiety, and $A_1$ is a radical of formula

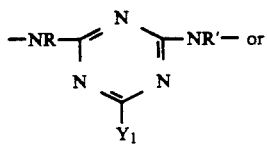 (3)

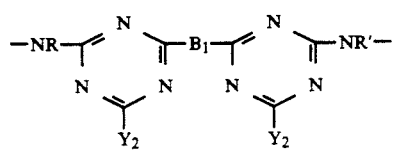 (4)

wherein R and R' are hydrogen or unsubstituted or substituted $C_1$-$C_8$alkyl, $Y_1$ in the radical of formula (3) and $Y_2$ in the radical of formula (4) is hydroxy, $C_1$-$C_4$alkoxy, chloro, bromo, $C_1$-$C_4$alkylthio, amino, N-mono- or N,N-di-$C_1$-$C_4$alkylamino which is unsubstituted or substituted in the alkyl moiety or moieties by hydroxy, sulfo, carboxy or $C_1$-$C_4$alkoxy, or cyclohexylamino, phenylamino or N-$C_1$-$C_4$alkyl-N-phenylamino which are unsubstituted or substituted in the phenyl moiety by $C_1$-$C_4$alkyl, $C_1$-$C_4$alkoxy, carboxy, sulfo or halogen, or are morpholino or 3-carboxy- or 3-carbamoylpyridin-1-yl, and $B_1$ is a linking group of the formula

—NR—(CH$_2$)$_{2-4}$—NR'—, (5)

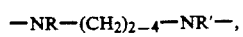 (6)

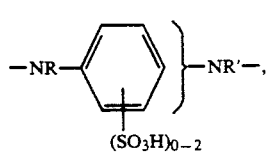 (7)

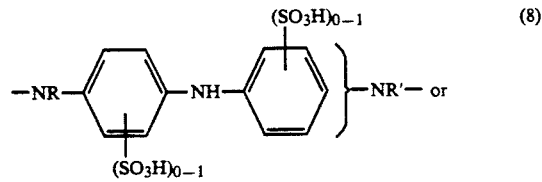 (8)

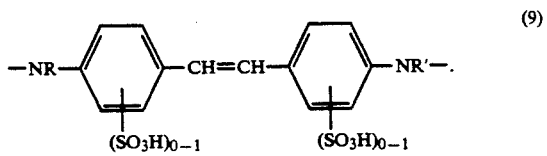 (9)

2. A process according to claim 1, wherein $R_1$, $R_2$, $R_3$, $R_4$, $R_5$, $R_6$, $R_7$ and $R_8$ are hydrogen, $C_1$-$C_4$alkyl, $C_1$-$C_4$alkoxy, $C_2$-$C_4$alkanoylamino, halogen or sulfo.

3. A process according to claim 1, wherein $R_1$, $R_2$, $R_3$ and $R_4$ are hydrogen or sulfo.

4. A process according to claim 1, wherein $Y_1$ and $Y_2$ are chloro, amino, N-mono- or N,N-di-$C_1$-$C_4$alkylamino which is unsubstituted or substituted in the alkyl moiety or moieties by hydroxy, or are phenylamino or morpholino.

5. A process according to claim 1, wherein the dye of formula (1) is a dye of formula

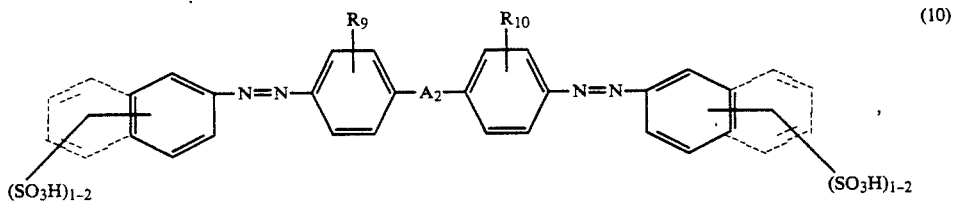 (10)

wherein $R_9$ and $R_{10}$ are hydrogen, $C_1$-$C_4$alkyl, $C_1$-$C_4$alkoxy, $C_2$-$C_4$alkanoylamino, halogen or sulfo, and $A_2$ is a radical of formula

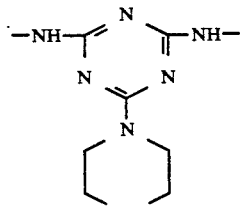

or

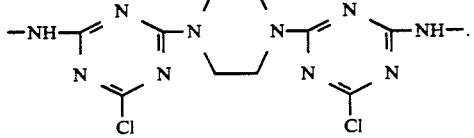

6. A process according to claim 1, wherein the dye of formula (1) is a dye of formula

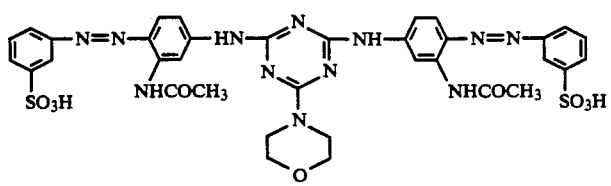         (11)

or

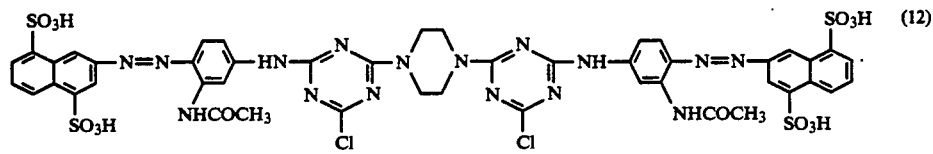    (12)

7. A process according to claim 1, wherein said dye mixture comprises at least one blue dyeing dye of the formula

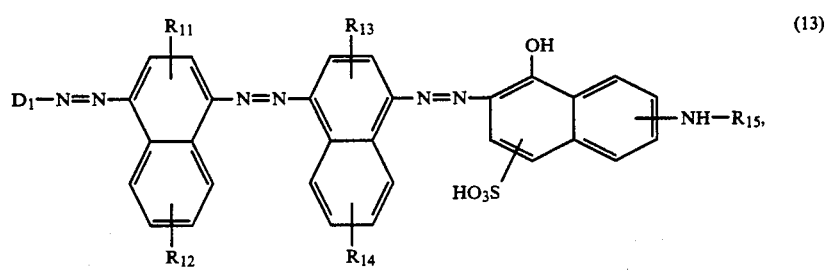   (13)

wherein $D_1$ is unsubstituted or substituted phenyl or naphthyl, $R_{11}$, $R_{12}$, $R_{13}$ and $R_{14}$ are hydrogen, unsubstituted or substituted $C_1$-$C_8$alkyl or $C_1$-$C_8$alkoxy, halogen, carboxy, sulfo, ureido or $C_2$-$C_6$alkanoylamino which is unsubstituted or substituted in the alkyl moiety and $R_{15}$ is hydrogen, unsubstituted or substituted $C_1$-$C_8$alkyl, unsubstituted $C_2$-$C_6$alkanoyl or $C_2$-$C_6$alkanoyl which is substituted in the alkyl moiety, or phenyl or benzoyl which are unsubstituted or substituted in the phenyl ring, or of the formula

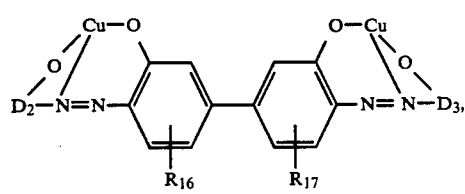  (14)

wherein $D_2$ and $D_3$ are unsubstituted or substituted naphthyl, and $R_{16}$ and $R_{17}$ are hydrogen, unsubstituted or substituted $C_1$-$C_8$alkyl or $C_1$-$C_8$alkoxy, halogen, carboxy, sulfo, ureido or $C_2$-$C_6$alkanoylamino which is unsubstituted or substituted in the alkyl moiety, or of the formula

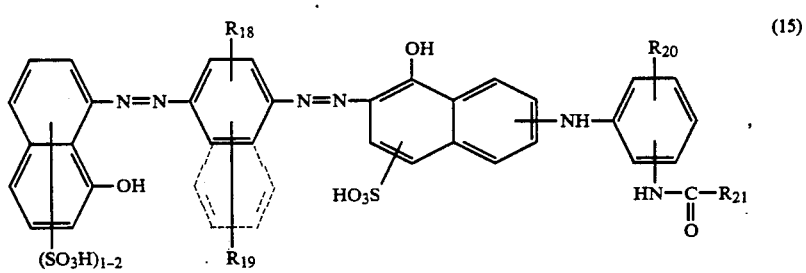  (15)

wherein $R_{18}$, $R_{19}$ and $R_{20}$ are hydrogen, unsubstituted or substituted $C_1$-$C_8$alkyl or $C_1$-$C_8$alkoxy, halogen, carboxy, sulfo, ureido or $C_2$-$C_6$alkanoylamino which is unsubstituted or substituted in the alkyl moiety, and $R_{21}$ is unsubstituted or substituted $C_1$-$C_8$alkyl or phenyl.

8. A process according to claim 1, wherein said dye mixture comprises at least one blue dyeing dye selected from the group consisting of

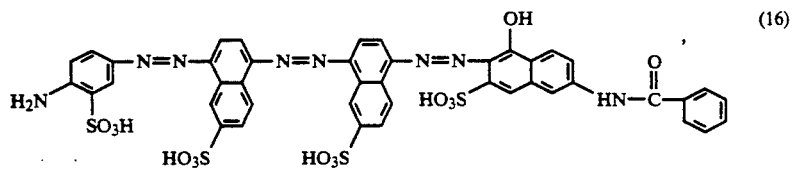
(16)

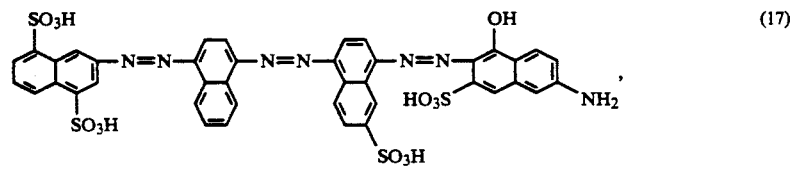
(17)

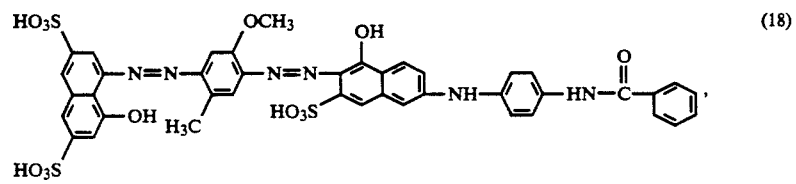
(18)

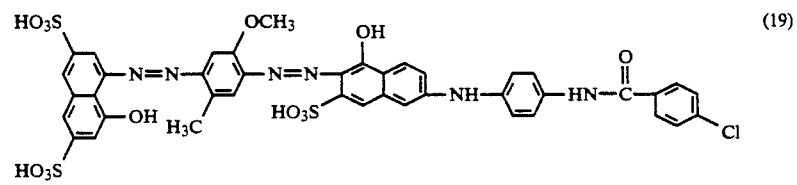
(19)

and

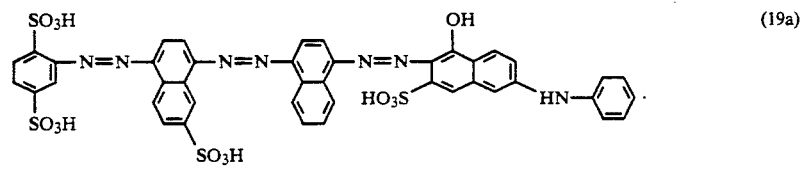
(19a)

9. A process according to claim 1, wherein said dye mixture comprises at least one red dyeing dye of the formula

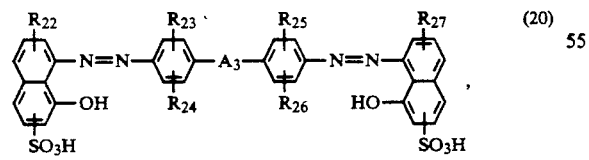
(20)

wherein $R_{22}$, $R_{23}$, $R_{24}$, $R_{25}$, $R_{26}$ and $R_{27}$ are hydrogen, unsubstituted or substituted $C_1$-$C_8$alkyl or $C_1$-$C_8$alkoxy, halogen, carboxy, sulfo, ureido or $C_2$-$C_6$alkanoylamino which is unsubstituted or substituted in the alkyl moiety, and $A_3$ is a radical of formula

—NH—,

-continued $$-NR-\overset{\overset{O}{\|}}{C}-NR'- \text{ or}$$

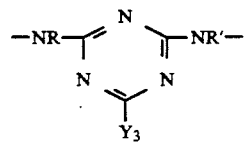

wherein R and R' are hydrogen or unsubstituted or substituted $C_1$-$C_8$alkyl, and $Y_3$ is hydroxy, $C_1$-$C_4$alkoxy, chloro, bromo, $C_1$-$C_4$alkylthio, amino, N-mono- or N,N-di-$C_1$-$C_4$alkylamino which is unsubstituted or substituted in the alkyl moiety or moieties by hydroxy, sulfo, carboxy or $C_1$-$C_4$-alkoxy, or cyclohexylamino, phenylamino or N-$C_1$-$C_4$alkyl-N-phenylamino which are unsubstituted or substituted in the phenyl nucleus by $C_1$-$C_4$alkyl, $C_1$-$C_4$alkoxy, carboxy, sulfo or halogen, or are morpholino or 3-carboxy- or 3-carbamoylpyridin-1-yl, or of the formula

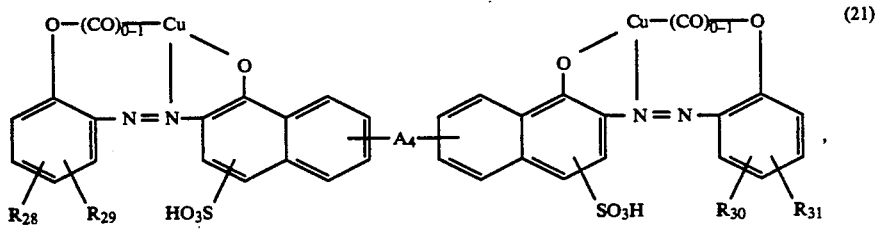

(21)

wherein $R_{28}$, $R_{29}$, $R_{30}$ and $R_{31}$ are hydrogen, unsubstituted or substituted $C_1$-$C_8$alkyl or $C_1$-$C_8$alkoxy, halogen, carboxy, sulfo, ureido, sulfamoyl or $C_2$-$C_6$alkanoylamino which is unsubstituted or substituted in the alkyl moiety, and $A_4$ is as defined for $A_3$ under formula (20), or of the formula

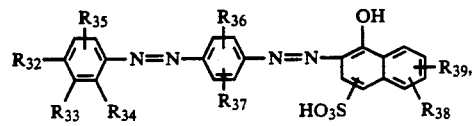

(22)

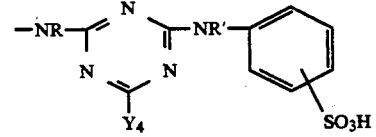

which may be further substituted in the phenyl ring, wherein R and R' are hydrogen or unsubstituted or substituted $C_1$-$C_8$alkyl and $Y_4$ is as defined for $Y_3$ under formula (20), or of the formula

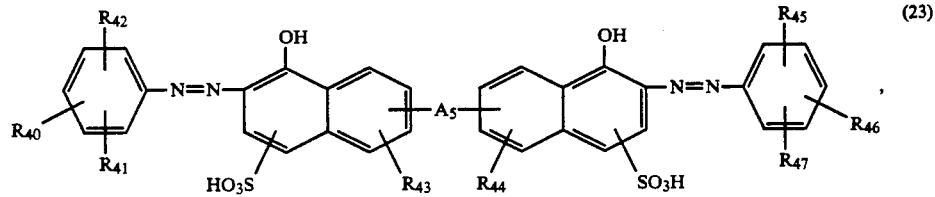

(23)

wherein $R_{32}$, $R_{33}$, $R_{34}$, $R_{35}$, $R_{36}$, $R_{37}$ and $R_{38}$ are hydrogen, unsubstituted or substituted $C_1$-$C_8$alkyl or $C_1$-$C_8$alkoxy, halogen, carboxy, sulfo, ureido or $C_2$-$C_6$alkanoylamino which is unsubstituted or substituted in the alkyl moiety, and $R_{39}$ is benzoylamino or benzoylamino which is substituted in the phenyl ring, or a radical of formula wherein $R_{40}$, $R_{41}$, $R_{42}$, $R_{43}$, $R_{44}$, $R_{45}$, $R_{46}$ and $R_{47}$ are hydrogen, unsubstituted or substituted $C_1$-$C_8$alkyl or $C_1$-$C_8$alkoxy, halogen, carboxy, sulfo, ureido or $C_2$-$C_6$alkanoylamino which is unsubstituted or substituted in the alkyl moiety, and $R_{40}$ and $R_{46}$ may additionally be phenylazo or phenylazo which is substituted in the phenyl ring, and $A_5$ is as defined for $A_3$ under formula (20), or is a radical of formula

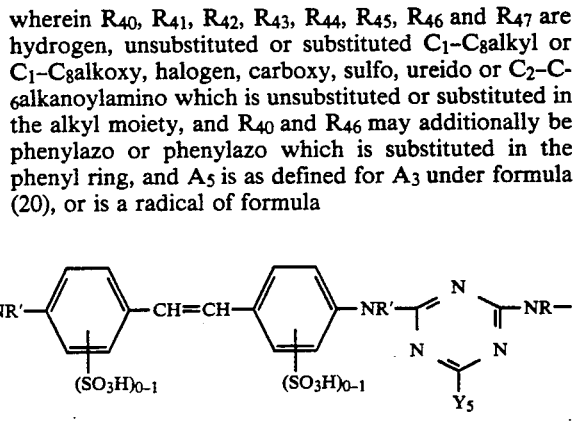

wherein R and R' are hydrogen or unsubstituted or substituted $C_1$-$C_8$alkyl and $Y_5$ is as defined for $Y_3$ under formula (20), or of the formula

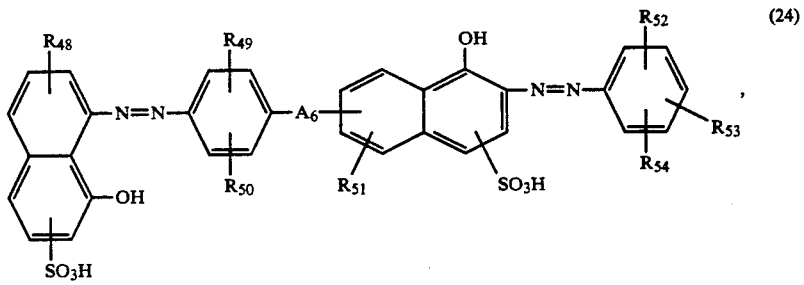

(24)

wherein $R_{48}$, $R_{49}$, $R_{50}$, $R_{51}$, $R_{52}$, $R_{53}$ and $R_{54}$ are hydrogen, unsubstituted or substituted $C_1$-$C_8$alkyl or $C_1$-$C_8$alkoxy, halogen, carboxy, sulfo, ureido or $C_2$-$C_6$alkanoylamino which is unsubstituted or substituted in the alkyl moiety, and $A_6$ is as defined for $A_3$ under formula (20).

10. A process according to claim 1, wherein said dye mixture comprises at least one red dyeing dye selected from the group consisting of

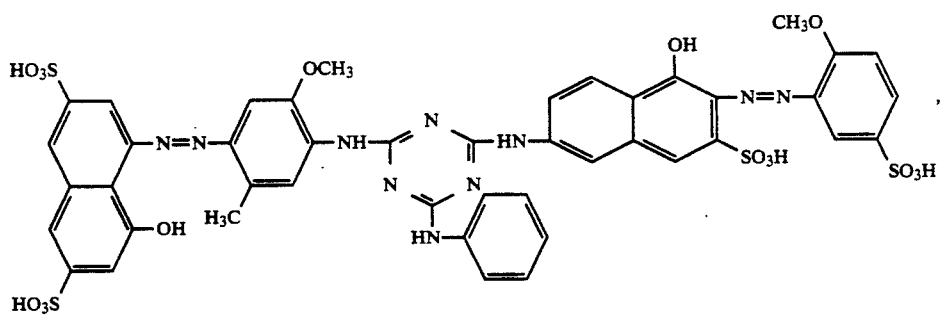 (25)

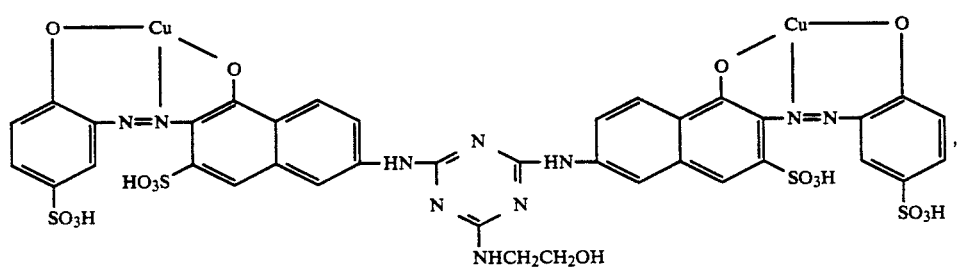 (26)

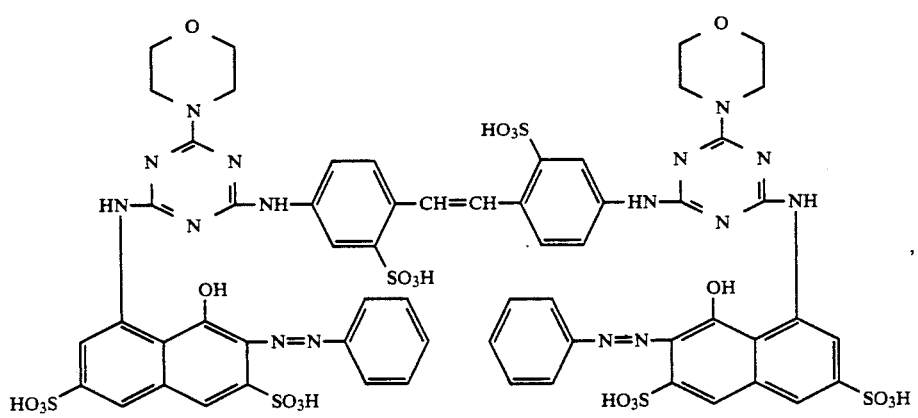 (27)

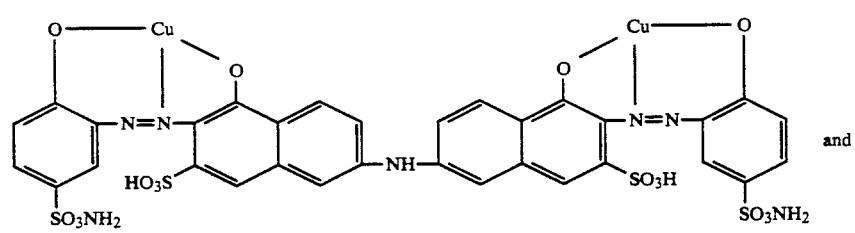 (28)

and

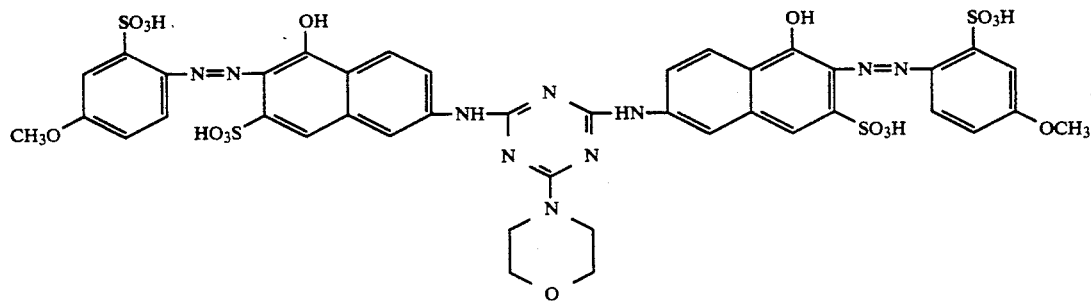 (29)

11. A process according to claim 10, wherein said dye mixture comprises least one yellow or orange dyeing dye selected from the group consisting of

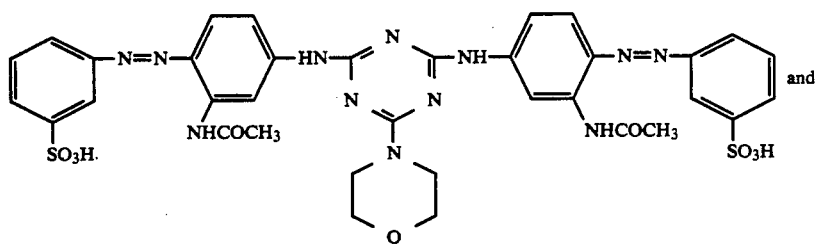
(11)
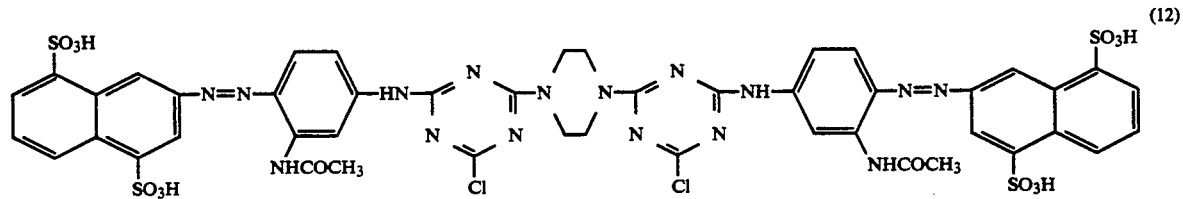
(12)
together with at least one blue dyeing dye selected from the group consisting of
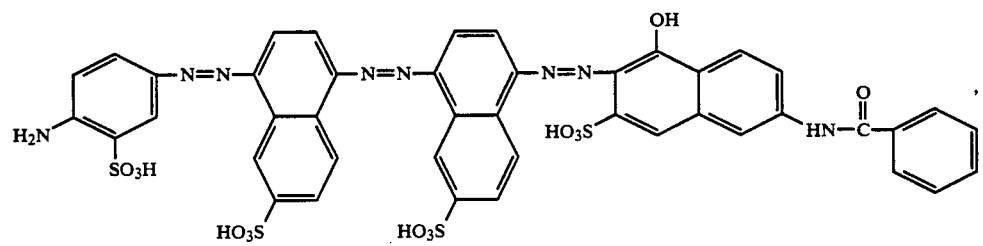
(16)
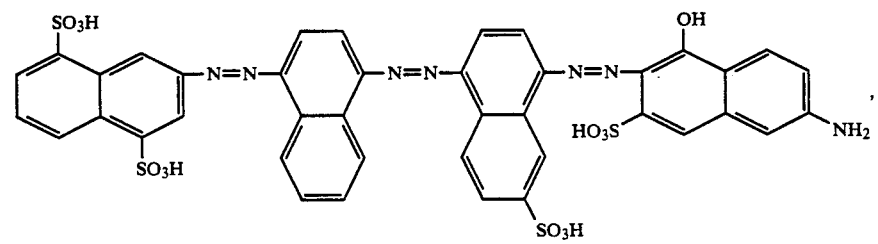
(17)
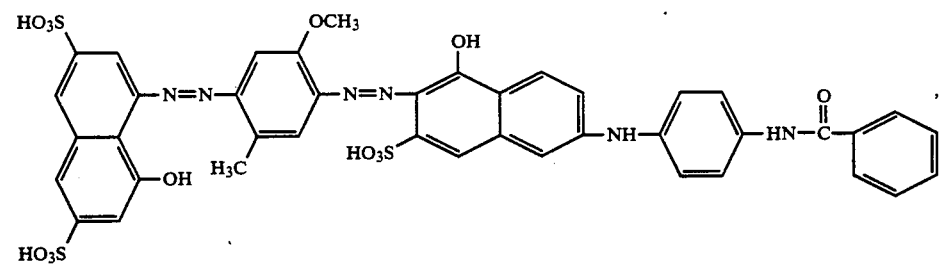
(18)
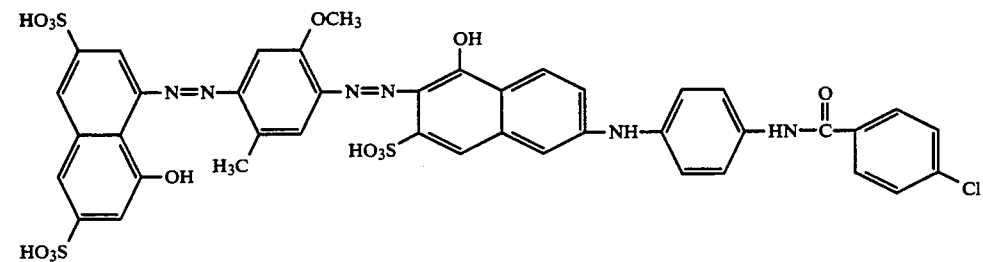
(19)
and -continued
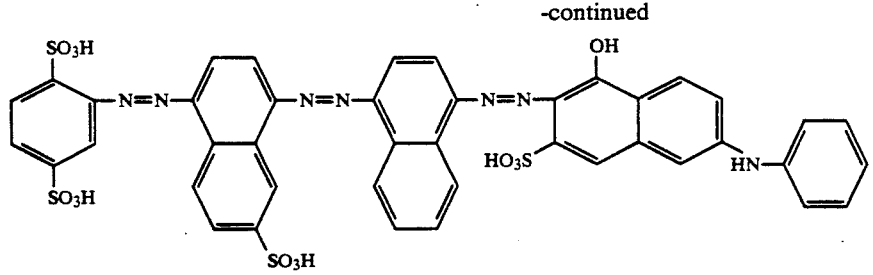
(19a)
and at least one red dyeing dye selected from the group consisting of
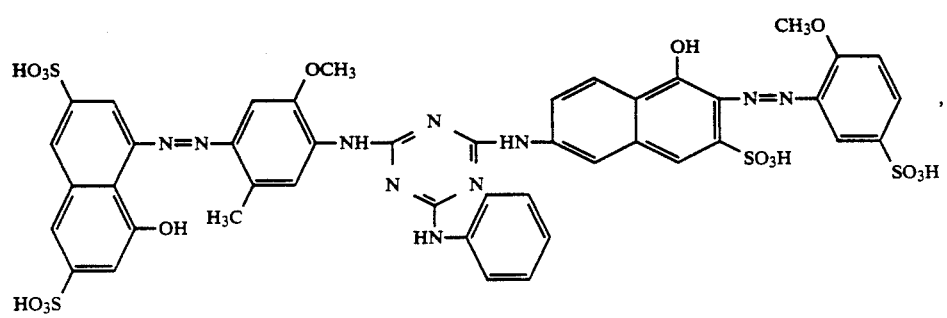
(25)
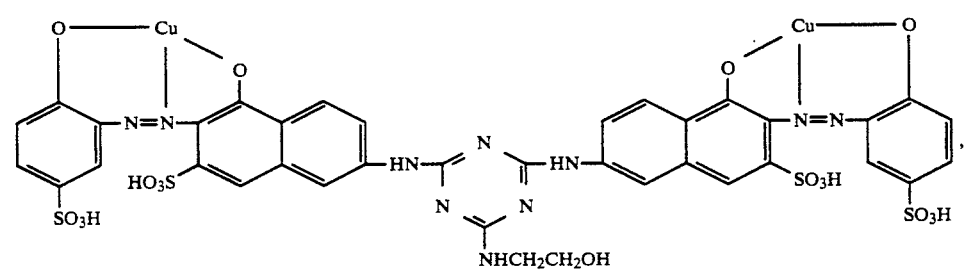
(26)
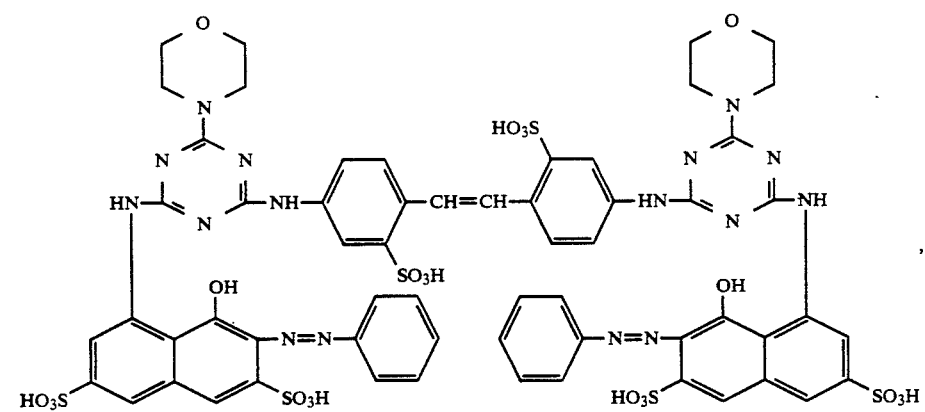
(27)
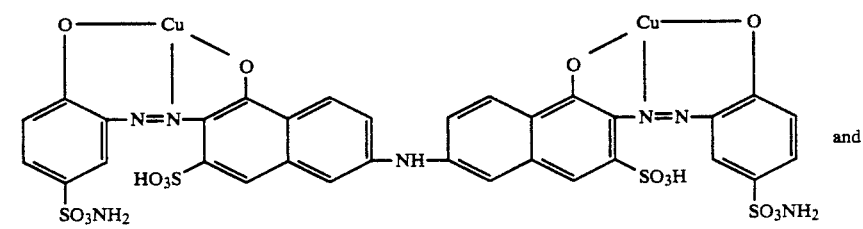
(28)
and

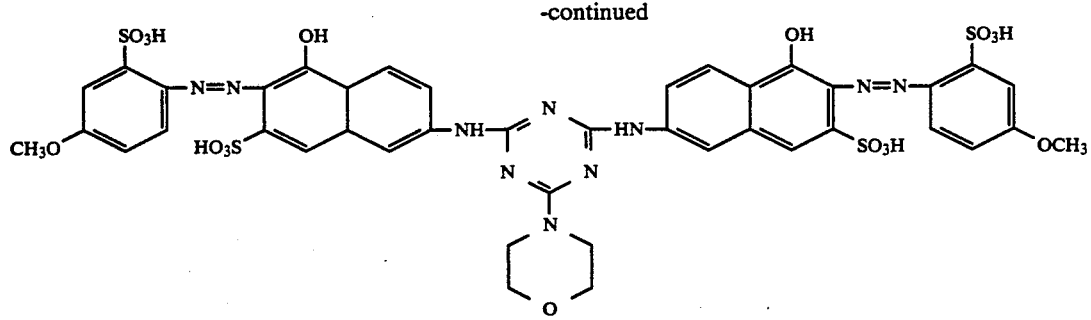

(29)

12. A process of claim 1 wherein the mixture of dyes is a trichromatic mixture which comprises at least one yellow or orange dye of formula (1), at least one blue dyeing dye and at least one red dyeing dye.

13. A process of claim 4 wherein $Y_1$ and $Y_2$ are morpholino or chloro.

14. A process of claim 11 wherein the dye mixture consists of a yellow dyeing dye of formula (11), a blue dyeing dye of formula (16) and a red dyeing dye of formula (25).

15. A process of claim 1 wherein an aqueous liquor comprising the dye mixture is applied to the material by the exhaust method, at a dyeing temperature of from 100° C. to 150° C., in the presence of a salt, wherein a portion of said salt is added to the aqueous liquor at the beginning of the process and then a further portion is added all at once or in increments shortly before the dyeing temperature is reached.

16. A process of claim 15 wherein the material is a polyester/cotton blend, the temperature is from 120° C. to 130° C., the pH is from 4 to 7.5, and the aqueous liquor comprises the dye mixture and a disperse dye.

17. A textile material dyed by a process of claim 1.

* * * * *